Dec. 22, 1953

W. C. WELTMAN ET AL 2,663,663

THERMOSETTING SYNTHETIC RESIN LAMINATE WITH
A PREDETERMINED ROUGHENED SURFACE AND
PROCESS FOR PRODUCING THE SAME
Filed Jan. 10, 1952

WITNESSES:
John E. Hensley
Wescott B. Northon

INVENTORS
William C. Weltman
Charles G. Kepple.
BY
Frederick Shapoe
ATTORNEY

Patented Dec. 22, 1953

2,663,663

UNITED STATES PATENT OFFICE 2,663,663

THERMOSETTING SYNTHETIC RESIN LAMINATE WITH A PREDETERMINED ROUGHENED SURFACE AND PROCESS FOR PRODUCING THE SAME

William C. Weltman and Charles G. Kepple, Pittsburgh, Pa., assignors to Westinghouse Electric Corporation, East Pittsburgh, Pa., a corporation of Pennsylvania Application January 10, 1952, Serial No. 265,886

8 Claims. (Cl. 154—121)

This invention relates to a thermosetting synthetic resin laminate having a novel roughened surface and process for preparing it.

The problem has arisen in painted and also electroplated printed electrical circuits that the metallic paint used will not adhere properly to bases comprising thermosetting synthetic resin laminates. Numerous attempts to provide a surface to which the paints will adhere have not proven satisfactory. For example, sand blasting and shot blasting produce a surface of roughened texture having a series of indentations, but the indentations so formed have either generally smooth inwardly converging plane surfaces, or smooth concavities. As a result, the adherence of the metallic paint to the base laminate is poor, there being no indentations on which the paint, after hardening, may effectively lock or wedge itself.

An object of this invention is thus to provide predetermined undercut pits, pores, or indentations in a surface of a thermosetting synthetic resinous laminate in order to produce a suitable surface to which paint will readily adhere.

A further object of this invention is to provide a process for producing a roughened surface in a thermosetting synthetic resinous member by imbedding a finely divided crystalline material in the surface of the resinous member and then removing the crystalline material from the member after it has been cured leaving undercut indentations.

Other objects of the invention will in part be obvious and will in part appear hereinafter.

For a better understanding of the nature and objects of the invention, reference should be had to the following detailed description and drawing, in which:

Fig. 3 is an enlarged fragmentary transverse sectional view of the laminar body of Fig. 2 with its surface film removed;

We have discovered a process by which a roughened surface comprising innumerable closely spaced, minute undercut indentations may be readily produced in a thermosetting synthetic resinous laminate. The process comprises imbedding in the surface sheet of the laminate, before curing, a finely divided, sharp-angled crystalline material which is acid or water soluble. After molding and curing the laminate, the crystalline material is exposed and then leached or dissolved from the laminate, leaving a roughened surface in which there are closely spaced, minute undercut indentations.

The size and spacing of the indentations will depend upon the size and amount of crystalline material imbedded in the surface sheet of the laminate. Satisfactory results have been obtained with finely divided crystalline material that will pass through a screen having from 100 to 300 meshes per lineal inch. A 100 mesh screen will provide a particle size of less than 6 mils, while a 300 mesh screen will provide a particle size of less than 2 mils. It is desirable, however, to maintain the particle size of a diameter of less than 6 mils. The particles should be applied to the surface in an amount sufficient to provide a spacing between particles no greater than the particle size.

Suitable materials for imbedding in the surface sheet of the laminate are water or acid soluble salts, metals, or oxides, such as sodium chloride, calcium carbonate or marble and granular aluminum.

It has been found that finely divided crushed marble gives good results. Finely divided crushed marble has sharp angles, capacity to retain its shape under the heat and pressure used in molding laminates, and is readily soluble in acids, such as dilute hydrochloric acid.

Figure 1:
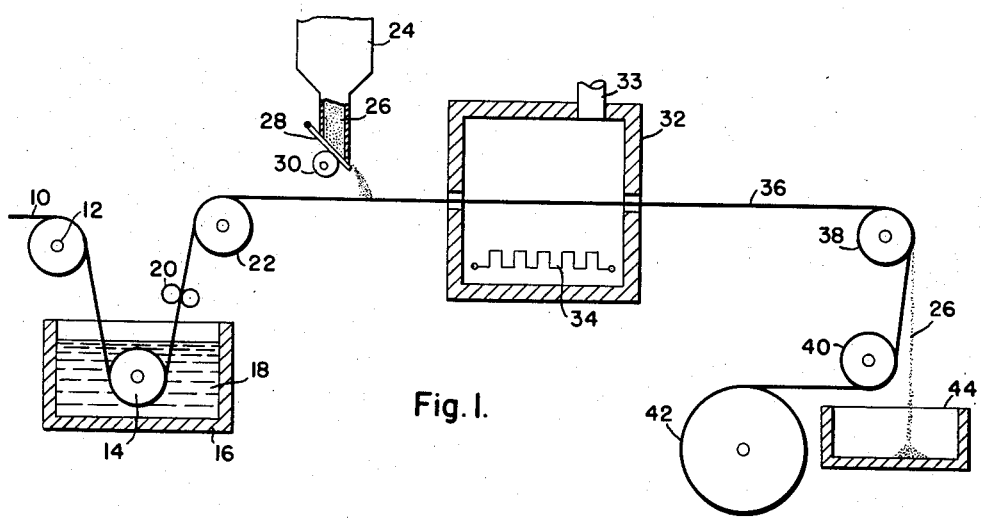
Figure 1 is a schematic view of apparatus for applying a resin varnish to sheet fibrous material, applying finely divided crystalline material to the wet sheet, and advancing the impregnated sheet to the B stage.

Referring to Fig. 1 of the drawing, the sheet fibrous material 10 passes over a guide roll 12 and downwardly under a guide roll 14 disposed within a varnish impregnating tank 16, containing a phenolic varnish 18 in the low polymeric or A stage. In such manner, the sheet 10 may be impregnated with the varnish. The impregnated sheet 10 then passes between two squeeze rolls 20 which are so adjusted as to permit only a predetermined weight of phenolic varnish to remain on the sheet 10. A desirable resin ratio has been found to be from 2 to 2.5. The resin ratio is defined as the weight of the untreated sheet plus the added weight of the resin to the weight of the untreated sheet.

In practicing the invention, good results were obtained when the phenolic varnish 18 was composed of phenolaldehyde resin. It is to be understood, however, that other thermosettable resinous varnishes may be employed, depending on the requirements of the work to be done.

The sheet 10 impregnated with the phenolic varnish then passes over roll 22 and thence beneath a hopper 24 containing finely divided crystalline material 26. The hopper 24 is provided with a discharge means comprising a pivoted gate member 28 actuated by a rotating eccentric 30, whereby a continuous layer of finely divided crystalline material is deposited on the wet sheet 10. A vibrator (not shown since it is well known in the arts) may be applied to the gate member 28 to assure the operation of the gate and a uniform flow of the crystalline material from the hopper. The sheet 10 impregnated with the phenolic varnish 18 and carrying the finely divided crystalline material 26 then passes into a drying oven 32 provided with suitable heating means such as an electrical resistance element 34. In the oven 32 the coated sheet material is heated to a predetermined temperature sufficient to volatilize or remove the organic solvent and any water that may be in the varnish. In the oven 32, the conversion of the phenol-aldehyde resin to the B stage is accomplished. The finely divided crystalline material 26 will adhere to the resin on the surface of the resulting dried sheet 36.

The oven is provided with a stack 33 for the escape of vapors. If conditions require a ventilating fan of any well known type (not shown) may be mounted in the stack.

The dried, resin impregnated, sheet 36 covered with a crystalline material as it comes from the oven 32 passes over guide rolls 38 and 40 and is wound into a roll 42. The guide roll 40 is positioned below and at a predetermined distance from the vertical through the guide roll 38, and behind the guide roll 38, in order that any excess of finely divided crystalline material 26 that does not adhere to the sheet will fall off and into a receptacle 44.

The sheet 36, after being cut to a predetermined size, is placed with its covered surface uppermost on a stack of sheets of the same predetermined size, not covered with crystalline material, that are to be laminated into a cured unitary body. The stack comprises a plurality of body sheets advanced to the B stage, and a top sheet 36 provided with a layer of crystalline material. It will be understood that in making laminates, sheets 36 may be applied to both the top and bottom of the stack. The assembled stack is then advanced in the process and brought to the final C stage by heat and pressure.

Figure 2:
Fig. 2 is an enlarged, fragmentary transverse sectional view of a laminar body impregnated with a resinous varnish and finely divided crystalline material.
Figure 1:
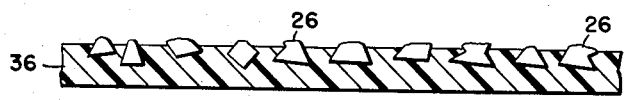
Figure 4:
Fig. 4 is an enlarged fragmentary transverse sectional view of the laminar body after the finely divided crystalline material has been removed.

As is shown in Fig. 2, the finely divided crystalline material 26 is imbedded in the laminar body formed, and is covered by a thin layer or film 46 of resin. This top film 46 is removed by mechanical means, such as abrading with a wire brush, sand blasting, or by dissolving in a strong alkali. The removal of this top film exposes portions of the finely divided crystalline material 26, as is shown in Fig. 3. The exposed imbedded crystalline material 26 is then dissolved with a solvent such as a dilute mineral acid, leaving a plurality of undercut minute pores, or indentations 48, as shown in Fig. 4. These undercut indentations 48 provide a roughened surface that a paint will readily adhere to. In fact, when paint hardens, it is keyed to the laminate.

The solvent used to leach out or dissolve the crystalline particles will, of course, depend upon the material used. Acetic acid, muriatic acid, and sulfuric acid are examples of acids suitable for reacting with marble.

*Example*

A resin is prepared by reacting the following:

| | |
|---|---|
| Phenol (hydroxy benzene) | 1.0 |
| Formaldehyde (38% aqueous solution) mole_ | 1.25 |
| Ethylene diamine (70% aqueous solution) percent of weight of phenol | 0.5 |

The resulting A-stage resin is dissolved in an alcohol-toluene mixture to provide a 45% resin solids solution.

Absorbent alpha paper is then impregnated with the phenolic resin solution being heated to evaporate the solvent and to convert the resin to the B stage.

The resin ratio for the top sheet is 2:2 and the resin ratio for the sheets that make up the body is 1:8. Finely divided marble that passes through a sieve having 200 meshes per lineal inch is dusted on the resin impregnated top sheet before it is heated. The top sheet and the body sheets are stacked with the marble powder facing outwardly and the stack is cured at 900 p. s. i. at 160° C. for 20 minutes. The film of resin on the top is removed from the laminated body by light sand blasting, thereby exposing surfaces of the imbedded marble particles.

The laminate is then immersed in 10% hydrochloric acid solution for 5 minutes and the exposed imbedded marble particles are dissolved. After washing with water and drying, the laminated member has a surface of roughened texture which under a microscope shows undercut indentations. Electrically conducting paint when applied to the laminated member, adheres well.

Since certain changes may be made in the above invention and different embodiments of the invention may be made without departing from the scope thereof, it is intended that all matter contained in the above description or taken in connection with the accompanying drawing shall be interpreted as illustrative and not in a limiting sense.

We claim as our invention:

1. In the method of preparing an undercut roughened surface on a thermoset resinous laminated body, the steps comprising covering a varnished sheet which is to form the top sheet of the laminated body with a uniform layer of finely divided marble which will pass through a sieve having from 100 to 300 meshes per lineal inch, the varnish on said sheet being wet due to solvent being present and in the A stage at the time of application of said marble, heating the sheet to evaporate the solvent in the varnish and to advance the covered sheet to the B stage, positioning the marble covered B stage sheet with its marble covered side facing outwardly on a stack of resin impregnated sheets to be laminated, subjecting the assembled sheets to heat and pressure to form a cured laminate whereby the marble is imbedded in the surface of the body to be roughened, the marble being slightly imbedded to the extent that a thin film of resin covers the marble, removing the film of resin to a depth sufficient to expose the uppermost surfaces of the imbedded particles of marble, and removing the imbedded marble by leaching with a mineral acid.

2. In the method of preparing an undercut, roughened surface on a thermoset resinous laminated body, the steps comprising covering a varnished sheet which is to form the top sheet of the laminated body with a uniform layer of finely divided marble which will pass through a sieve having from 100 to 300 meshes per lineal inch, the varnish on said sheet being wet due to the solvent being present and in the A stage at the time of application of said marble, heating the sheet to evaporate the solvent in the varnish and to advance the covered sheet to the B stage, positioning the marble covered B stage sheet with its marble covered side outwardly on a stack of resin impregnated sheets to be laminated, subjecting the assembled sheets to heat and pressure to form a cured laminate, whereby the marble is imbedded in the surface of the body to be roughened, the marble being imbedded to the extent that a thin film of resin covers said marble, removing the film of resin by mechanical means to a depth sufficient to expose the uppermost surfaces of the imbedded particles of marble, and removing the imbedded marble by leaching with a mineral acid.

3. In the method of preparing an undercut roughened surface on a thermoset resinous laminated body, the steps comprising covering a varnished sheet which is to form the top sheet of the laminated body with a uniform layer of finely divided marble which will pass through a sieve having from 100 to 300 meshes per lineal inch, the varnish on said sheet being wet due to the solvent being present and in the A stage at the time of application of said marble, heating the sheet to evaporate the solvent in the varnish and to advance the covered sheet to the B stage, positioning the marble covered B stage sheet with its marble covered side outwardly on a stack of resin impregnated sheets to be laminated, subjecting the assembled sheets to heat and pressure to form a cured laminate whereby the marble is imbedded in the surface of the body to be roughened, the marble being slightly imbedded to the extent that a thin film of resin covers said marble, removing the film of resin to a depth to expose the uppermost surfaces of the imbedded particle marble by treating said film with an alkali, and removing the imbedded marble by leaching with a mineral acid.

4. An article of manufacture comprising a resinous laminated body suitable for use as a base for printed electrical circuits, said laminated body comprising sheets of fibrous material impregnated with a resin, at least one surface of said laminated body being of roughened texture, said roughened texture comprising a multiplicity of minute undercut indentations, said indentations being not more than 6 mils in depth and diameter and spaced apart a distance of not more than 6 mils.

5. In the method of preparing an undercut roughened surface on a thermoset resinous laminated body, the steps comprising imbedding a surface of the resinous laminated body with a finely divided, sharp-angled crystalline material which is soluble in a mineral acid, and removing said crystalline material by leaching with the mineral acid.

6. A resinous laminated body having an undercut roughened surface suitable for use as a base for printed electrical circuits, said surface being prepared by the method recited in claim 1.

7. In the method of preparing an undercut roughened surface on a thermoset resinous body, the steps comprising imbedding a surface of the resinous laminated body with a finely divided, sharp-angled crystalline material capable of being dissolved, and removing the imbedded crystalline material by leaching with a suitable solvent, whereby there is produced on the surface of the thermoset body a multiplicity of minute undercut indentations.

8. A resinous laminated body having an undercut roughened surface suitable for use as a base for printed electrical circuits, said surface being prepared by the method recited in claim 7.

WILLIAM C. WELTMAN.
CHARLES G. KEPPLE.

References Cited in the file of this patent

UNITED STATES PATENTS

| Number | Name | Date |
|---|---|---|
| 1,149,974 | Chisholm | Aug. 10, 1915 |
| 2,004,708 | Pfanstiehl | June 11, 1935 |
| 2,037,545 | Sexton | Apr. 14, 1936 |
| 2,083,484 | Zampol | June 8, 1937 |
| 2,109,190 | Coffey | Feb. 22, 1938 |
| 2,147,218 | Reimel | Feb. 14, 1939 |
| 2,309,571 | Bruce et al. | Jan. 26, 1943 |
| 2,310,400 | Crane et al. | Feb. 9, 1943 |
| 2,328,998 | Radford | Sept. 7, 1943 |
| 2,413,500 | Hummel | Dec. 31, 1946 |
| 2,439,137 | Keller | Apr. 6, 1948 |
| 2,586,820 | Hemperly et al. | Feb. 26, 1952 |
| 2,623,241 | Mackay | Dec. 30, 1952 |